(12) United States Patent
Kweon et al.

(10) Patent No.: US 7,309,546 B2
(45) Date of Patent: Dec. 18, 2007

(54) POSITIVE ACTIVE MATERIAL FOR RECHARGEABLE LITHIUM BATTERY

(75) Inventors: Ho-Jin Kweon, Cheonan (KR);
Jun-Won Suh, Cheonan (KR);
Kyung-Ho Kim, Cheonan (KR);
Hee-Young Sun, Cheonan (KR)

(73) Assignee: Samsung SDI Co., Ltd., Suwon-si (KR)

( * ) Notice: Subject to any disclaimer, the term of this patent is extended or adjusted under 35 U.S.C. 154(b) by 383 days.

(21) Appl. No.: 10/264,043

(22) Filed: Oct. 3, 2002

(65) Prior Publication Data

US 2003/0138699 A1 Jul. 24, 2003

(30) Foreign Application Priority Data

Jan. 24, 2002 (KR) ................ 2002-4292

(51) Int. Cl.
*H01M 4/58* (2006.01)
(52) U.S. Cl. .............. 429/231.1; 429/231.2; 429/231.3; 429/232; 427/58; 427/126.3; 427/126.4; 427/126.6; 252/518.1; 252/520.4; 252/521.1; 252/521.2; 252/521.5
(58) Field of Classification Search ......... 429/218.1, 429/215, 231.1, 231.2, 231.3, 232; 427/58, 427/126.3, 126.4, 126.6; 252/518.1, 520.4, 252/521.1, 521.2, 521.5
See application file for complete search history.

(56) References Cited

U.S. PATENT DOCUMENTS

| | | | | |
|---|---|---|---|---|
| 5,783,333 A | * | 7/1998 | Mayer ................ | 429/223 |
| 6,268,085 B1 | * | 7/2001 | Manthiram et al. ....... | 429/224 |
| 6,372,385 B1 | * | 4/2002 | Kweon et al. ........... | 429/231.3 |
| 6,682,850 B1 | * | 1/2004 | Numata et al. ......... | 429/224 |
| 2001/0031399 A1 | * | 10/2001 | Jung et al. ............ | 429/231.1 |

FOREIGN PATENT DOCUMENTS

| | | |
|---|---|---|
| CN | 1228620 | 9/1999 |
| JP | 9-180718 | 7/1997 |
| JP | 1999-0071411 | 9/1999 |
| JP | 11-297362 | 10/1999 |
| JP | 2000-195513 | 7/2000 |
| JP | 2001-256979 | 9/2001 |
| JP | 2002-42816 | 2/2002 |
| JP | 2002-208441 | 7/2002 |
| WO | WO98/04010 | 1/1998 |

OTHER PUBLICATIONS

Patent Abstracts of Japan, Publication No. 2000-195513, Publication Date Jul. 14, 2000.
Patent Abstracts of Japan for Publication No. 09-180718, date of publication of application Jul. 11, 1997, in the name of M. Nagayama et al.
Patent Abstracts of Japan for Publication No. 2000-195513, date of publication of application Jul. 14, 2000, in the name of M. Yamashita et al.
Patent Abstracts of Japan for Publication No. 2001-256979, date of publication of application Sep. 21, 2001, in the name of H. Kweon et al.
Patent Abstracts of Japan for Publication No. 2002-208441, date of publication of application Jul. 26, 2002, in the name of C. Kanbe et al.
Patent Abstracts of Japan for Publication No. 2002-042816, date of publication of application Feb. 8, 2002, in the name of I. Kuribayashi.
Patent Abstracts of Japan for Publication No. 11-297362; Date of publication of application Oct. 29, 1999, in the name of Toru Matsui et al.

* cited by examiner

*Primary Examiner*—Laura Weiner
(74) *Attorney, Agent, or Firm*—Christie, Parker & Hale, LLP (57) ABSTRACT

Disclosed is a positive active material for a rechargeable lithium battery, including a lithiated intercalation compound and an additive compound. The additive compound comprises one or more intercalation element-included oxides which have a charging voltage of 4.0 to 4.6V when 5-50% of total intercalation elements of the one or more intercalation element-included oxides are released during charging.

4 Claims, 4 Drawing Sheets

POSITIVE ACTIVE MATERIAL FOR RECHARGEABLE LITHIUM BATTERY

CROSS REFERENCE TO RELATED APPLICATION

This application claims priority to application No. 2002-4292, filed in the Korean Intellectual Property Office on Jan. 24, 2002, the disclosure of which is incorporated hereinto by reference.

BACKGROUND OF THE INVENTION (a) Field of the Invention

The present invention is directed to to a positive active material for a rechargeable lithium battery and, more particularly, to a positive active material for a rechargeable lithium battery exhibiting high capacity.

(b) Description of the Related Art

As the recent trend is toward more compact and lighter portable electronic equipment, the need has increased for a high performance and high capacity battery for electric power for portable electronic equipment. Especially with the forthcoming commercialization of IMT 2000 service, the demand for high capacity battery is greater than ever, and many battery manufacturers are already intensely researching high specific capacity batteries.

In order to increase the specific capacity of a battery, either development of a high capacity positive active material or a more compact positive active material content is needed.

For a high-capacity positive active material, $LiCoO_2$ is widely used, and there is considerable desire to find a higher energy-density active material. One scheme to satisfy such a demand is to develop $LiNi_xCo_yO_2$ (where, x=0.1 to 0.99, and y=0.01 to 0.9) or $LiNi_xMn_yO_2$ (where, x=0.1 to 0.99, and y=0.01 to 0.9) compounds for the positive active material, which exhibit a higher discharge capacity than $LiCoO_2$ by 20-30%. Another scheme is to increase the energy density per weight of the positive active material by using a nano composite compound of V or Fe.

In order to increase the loading level of the positive active material in the given volume of the battery cell, a thin separator or a thin can may be used. Alternatively, the density of the active composite of the electrode can be increased to improve the volumetric energy density (Wh/Liter) of the battery cell.

Although many advances have been made in the technology of positive active materials for batteries, the desire to further improve the charging and discharging capacity of the active materials led to continuous development of such materials.

SUMMARY OF THE INVENTION

The present invention is directed to a positive active material for a rechargeable lithium battery. According to an embodiment of the present invention, the positive active material includes a lithiated intercalation compound and an additive compound, wherein the additive compound comprises one or more intercalation element-included oxides having a charge voltage of 4.0 to 4.6V when 5-50% of total intercalation elements of the one or more intercalation element-included oxide are released during charging.

According to another embodiment of the present invention, the positive active material includes a lithiated intercalation compound and an additive compound, wherein the additive compound comprises one or more intercalation element-included oxides having a discharge voltage of 4.0 to 5.0V when 5-50% of total intercalation elements of the one or more intercalation element-included oxides are released during discharging.

According to still another embodiment of the present invention, the positive active material includes a lithiated intercalation compound and an additive compound, wherein the additive compound comprises one or more intercalation element-included oxides having two discharging plateaus within the voltage range of 4 to 5V during discharge.

According to still another embodiment of the present invention, the mixed positive active material includes a lithiated intercalation compound and an additive compound, wherein the additive compound comprises one or more intercalation element-included oxides prepared by mixing intercalation element sources, manganese sources, and nickel sources to prepare a mixture and heat-treating the mixture.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings, wherein.

DETAILED DESCRIPTION OF THE INVENTION

The present invention relates to a positive active material for a rechargeable lithium battery exhibiting high capacity. The conventional research to accomplish a high-capacity positive active material has been focused on the synthesis of new active materials other than $LiCoO_2$, which is widely used for positive active materials. The present invention improves the utilization of the conventional active material rather than synthesizing new active material.

The amount of $Li^+$ participating in electrochemical reactions at positive and negative electrodes is a critical factor for determining the capacity of a battery. That is, the capacity depends on the utilization of $LiCoO_2$. Generally, it is known that only half (i.e. 0.5M) of the total $Li^+$ in $LiCoO_2$ participates in electrochemical reactions (4.2V to 2.75V). Thus, it is expected that if the utilization of $LiCoO_2$ increases over 0.5 Li per $LiCoO_2$, the capacity will improve over the state of the art.

The present invention can increase the utilization of positive active materials simply by adding an additive compound to a lithiated compound used as the conventional active material. The additive compounds show a two-plateau charge-discharge voltage characteristic whereas the conventional active material, for example $LiCoO_2$, shows a single-plateau charge-discharge voltage curve. Both charge and discharge voltages of the two-plateau curves of the additive compounds are higher than the corresponding plateau voltages of $LiCoO_2$. The full-charge voltage for the lower voltage plateau of the additive compounds, for example, intercalation element-included oxides prepared by a solid phase synthesis method according to the present invention, is approximately 4.4V. An average discharge voltage for this plateau of the additive compounds is approximately 0.2V higher than that of the $LiCoO_2$. The capacity of the lower voltage plateau of the additive compounds, intercalation element-included oxides, ranges from 10 to 40% of the theoretical capacity of the compounds for full lithium extraction. The compounds of similar compositions but prepared by a co-precipitation synthesis method showed only a minimal capacity, less than 10% of the theoretical capacity, for the lower voltage plateau. This latter compound does not improve the electrode capacity when it is used as an additive compound to the conventional active material of $LiCoO_2$, whereas the additive compounds prepared by the solid phase method improved the electrode capacity significantly when they were used as additive compounds.

The intercalation element-included oxides have a charge-discharge voltage of 4.0 to 4.6V when 5-50% of total intercalation elements of the intercalation element-included oxides are released during charging.

Preferred intercalation element-included oxides are lithium-included oxides or sodium-included oxides. More preferred is an intercalation element-included manganese-based compound such as $MMn_{2-x}Ni_xO_4$, where M is Li or Na, and x is 0.1 to 0.9.

One example of the solid-phase reaction for this intercalation element-included manganese-based compound comprising manganese and nickel will be illustrated below in detail.

An intercalation element source, a manganese source, and a nickel source are mixed together, and the resulting mixture is heat-treated. As a result, intercalation element-included oxides are prepared.

The mixing ratio of the intercalation element source, the manganese source, and the nickel source may be controlled according to the desired composition. The heat-treating step is preferably performed at 600 to 1000° C. If the heat-treating temperature is less than 600° C., a crystalline material is not likely be formed. If the heat-treating temperature is more than 1000° C., Li is easily lost by evaporation due to to obtain unwanted material.

Any compound that includes intercalation elements may be used as the intercalation element source, and exemplary thereof are lithium sources and sodium sources. The preferred intercalation element source is a lithium source. Exemplary sodium sources include sodium nitrate and sodium sulfate. Exemplary lithium sources include lithium hydroxide, lithium nitrate, and lithium acetate.

Exemplary manganese source include manganese acetate and manganese dioxide, and exemplary nickel sources include nickel hydroxide, nickel nitrate, and nickel acetate.

The positive active material of the present invention includes 99.99 to 70 wt %, preferably 99.99 to 80 wt %, and more preferably 99.9 to 90 wt %, of a lithiated intercalation compound, and 0.01 to 30 wt %, preferably 0.01 to 20 wt %, and more preferably 0.1 to 10 wt %, of the intercalation element-included oxides. If the amount of the intercalation element-included oxides is less than 0.01 wt %, the effect of the addition is not sufficiently high enough to show any changes in the capacity. On the other hand, if the amount of the intercalation element-included oxides is more than 30 wt %, the discharge capacity is reduced due to the added weight of the intercalation element-included oxide.

The lithiated intercalation compound used in the present invention may be a bare compound represented in the following formulas (1) to (12), or a surface-treated compound, which is a bare compound coated with metal oxide.

$$Li_xMn_{1-y}M_yA_2 \qquad (1)$$

$$Li_xMn_{1-y}M_yO_{2-z}X_z \qquad (2)$$

$$Li_xMn_2O_{4-z}X_z \qquad (3)$$

$$Li_xCo_{1-y}M_yA_2 \qquad (4)$$

$$Li_xCo_{1-y}M_yO_{2-z}X_z \qquad (5)$$

$$Li_xNi_{1-y}M_yA_2 \qquad (6)$$

$$Li_xNi_{1-y}M_yO_{2-z}X_z \qquad (7)$$

$$Li_xNi_{1-y}Co_yO_{2-z}X_z \qquad (8)$$

$$Li_xNi_{1-y-z}Co_yM_zA_\alpha \qquad (9)$$

$$Li_xNi_{1-y-z}Co_yM_zO_{2-\alpha}X_\alpha \qquad (10)$$

$$Li_xNi_{1-y-z}Mn_yM_zA_\alpha \qquad (11)$$

$$Li_xNi_{1-y-z}Mn_yM_zO_{2-\alpha}X_\alpha \qquad (12)$$

wherein $0.90 \leq x \leq 1.1; 0 \leq y \leq 0.5; 0 \leq z \leq 0.5; 0 \leq \alpha \leq 2;$ M is selected from Al, Ni, Co, Mn, Cr, Fe, Mg, Sr, V, and rare earth elements;

A is selected from O, F, S and P; and

X is selected from F, S, and P.

The surface-treated compound is a compound coated with metal oxide. The surface-treated compound can be prepared by the procedures described in Korean Patent Application No. 98-42956, the disclosure of which is incorporated herein by reference. These procedures include coating the bare compound with an organic liquid or an aqueous liquid of a coating material source, and heat-treating it. The liquid may be in the form of a suspension or solution. The coating material source can be a coating element or a coating element-included alkoxide, salt, or oxide. Suitable coating material sources may be chosen from coating elements, and coating element-included alkoxides, salts, and oxides according to the type of the solvent, which is well known to one skilled in the related arts. For example, if an organic solvent is used for the solvent, then the coating element or the coating element-included alkoxide, salt, or oxide may be used for the coating material source, and if water is used for the solvent, then the coating element-included salt or oxide may be used for the coating material source.

The coating element in the coating material source may be any element that is capable of being dissolved in an organic solvent or water. Examples are Mg, Al, Co, K, Na, Ca, Si, Ti, V, Sn, Ge, Ga, B, As, Zr, and mixtures thereof. Useful organic solvents include hexane, chloroform, tetrahydrofuran, ether, methylene chloride, acetone, and alcohol, such as methanol, ethanol or isopropanol.

An exemplary organic liquid is a coating element-included alkoxide liquid. The alkoxide liquid may be prepared by adding the coating element to an alcohol such as methanol, ethanol or isopropanol, and refluxing them, or by adding a coating element-included alkoxide such as methoxide, ethoxide, or isopropoxide to alcohol. The organic liquid or aqueous liquid may also be available through commercial purchase.

The following examples illustrate the present invention in further detail. However, it is understood that the present invention is not limited by these examples.

COMPARATIVE EXAMPLE 1

A prismatic cell with a capacity of 950 mAh was fabricated using a surface-treated $LiCoO_2$ positive active material. The surface-treated $LiCoO_2$ was prepared by coating $LiCoO_2$ with an Al-isopropoxide suspension and heat-treating it at 600° C. according to the procedure described in Korean Patent Application No. 98-42956. The negative active material used was an artificial graphite material, PHS, available from Japan Carbon Ltd., and the electrolyte used was a 1M $LiPF_6$ solution in a mixture of ethylene carbonate, dimethyl carbonate, diethyl carbonate and fluorobenzene (3:5:1:1 volume ratio).

A formation cycle of the prismatic cell was then performed at a 0.2C rate for both charge and discharge. The cell was then charged 4.2V at 0.2C rate and discharged to 2.75V at 0.5C rate for a standard capacity measurement. In addition, the cycle life characteristics tests and safety test (1C overcharging) were performed.

COMPARATIVE EXAMPLE 2

A prismatic cell was fabricated by the same procedure as in Comparative Example 1 except that the positive active material was a mixture of 99 wt % of the surface-treated $LiCoO_2$ and 1 wt % of $LiMn_{1.5}Ni_{0.5}O_4$ which was obtained from a co-precipitation process.

The co-precipitation process for preparing $LiMn_{1.5}Ni_{0.5}O_4$ was performed as follows: $MnSO_4$ and $NiSO_4$ were dissolved in water to prepare an aqueous solution containing Mn and Ni ions in the ratio of 3:1. $NH_4(OH)_2$ was added to the solution to co-precipitate Mn and Ni ions to obtain $Mn_{0.75}Ni_{0.25}(OH)_2$. The subsequently dried $Mn_{0.75}Ni_{0.25}(OH)_2$ was mixed with LiOH followed by heat-treating at 450° C. to prepare $LiMn_{1.5}Ni_{0.5}O_4$. The resultant material, $LiMn_{1.5}Ni_{0.5}O_4$, will be referred to as "co-precipitated $LiMn_{1.5}Ni_{0.5}O_4$".

COMPARATIVE EXAMPLE 3

A prismatic cell was fabricated by the same procedure as in Comparative Example 1, except that the positive active material was a mixture of 97 wt % of the surface-treated $LiCoO_2$ and 3 wt % of co-precipitated $LiMn_{1.5}Ni_{0.5}O_4$.

COMPARATIVE EXAMPLE 4

A prismatic cell was fabricated by the same procedure as in Comparative Example 1, except that the positive active material was a mixture of 95 wt % of the surface-treated $LiCoO_2$ and 5 wt % of co-precipitated $LiMn_{1.5}Ni_{0.5}O_4$.

COMPARATIVE EXAMPLE 5

A prismatic cell was fabricated by the same procedure as in Comparative Example 1, except that the positive active material was a mixture of 90 wt % of the surface-treated $LiCoO_2$ and 10 wt % of co-precipitated $LiMn_{1.5}Ni_{0.5}O_4$.

COMPARATIVE EXAMPLE 6

A prismatic cell was fabricated by the same procedure as in Comparative Example 1, except that the positive active material was a mixture of 85 wt % of the surface-treated $LiCoO_2$ and 15 wt % of co-precipitated $LiMn_{1.5}Ni_{0.5}O_4$.

COMPARATIVE EXAMPLE 7

A prismatic cell was fabricated by the same procedure as in Comparative Example 1, except that the positive active material was a mixture of 80 wt % of the surface-treated $LiCoO_2$ and 20 wt % of co-precipitated $LiMn_{1.5}Ni_{0.5}O_4$.

COMPARATIVE EXAMPLE 8

A prismatic cell was fabricated by the same procedure as in Comparative Example 1, except that the positive active material was a mixture of 99 wt % of a surface-treated $LiMn_2O_4$ and 1 wt % of co-precipitated $LiMn_{1.5}Ni_{0.5}O_4$. The surface-treated $LiMn_2O_4$ was prepared by coating $LiMn_2O_4$ with an Al-isopropoxide suspension and heat-treating them at 300° C. according to the procedure as shown in Korean Patent Application No. 98-42956.

COMPARATIVE EXAMPLE 9

A prismatic cell was fabricated by the same procedure as in Comparative Example 8, except that the positive active material was a mixture of 90 wt % of the 10 surface-treated $LiMn_2O_4$ and 10 wt % of co-precipitated $LiMn_{1.5}Ni_{0.5}O_4$.

COMPARATIVE EXAMPLE 10

A prismatic cell was fabricated by the same procedure as in Comparative Example 1, except that the positive active material was a mixture of 99 wt % of a surface-treated $LiNi_{0.9}Co_{0.1}Sr_{0.002}O_2$ and 1 wt % of co-precipitated $LiMn_{1.5}Ni_{0.5}O_4$. The surface-treated $LiNi_{0.9}Co_{0.1}Sr_{0.002}O_2$ was prepared by coating $LiNi_{0.9}Co_{0.1}Sr_{0.002}O_2$ with an Al-isopropoxide suspension and heat-treating them at 500° C. according to the procedure described in Korean Patent Application No. 98-42956.

COMPARATIVE EXAMPLE 11

A prismatic cell was fabricated by the same procedure as in Comparative Example 10, except that the positive active material was a mixture of 90 wt % of the surface-treated $LiNi_{0.9}Co_{0.1}Sr_{0.002}O_2$ and 10 wt % of co-precipitated $LiMn_{1.5}Ni_{0.5}O_4$.

COMPARATIVE EXAMPLE 12

A prismatic cell was fabricated by the same procedure as in Comparative Example 10, except that the positive active material was a mixture of 99 wt % of $LiNi_{0.68}Mn_{0.2}Co_{0.1}Mg_{0.01}Al_{0.01}O_2$ and 1 wt % of co-precipitated $LiMn_{1.5}Ni_{0.5}O_4$.

COMPARATIVE EXAMPLE 13

A prismatic cell was fabricated by the same procedure as in Comparative Example 10, except that the positive active material was a mixture of 90 wt % of $LiNi_{0.68}Mn_{0.2}Co_{0.1}Mg_{0.01}Al_{0.01}O_2$ and 10 wt % of co-precipitated $LiMn_{1.5}Ni_{0.5}O_4$.

EXAMPLE 1

99 weight percent (wt %) of "surface-treated $LiCoO_2$", which was coated with an Al-isopropoxide suspension and heat-treated at 600° C. as described in Korean Patent Application No. 98-42956, was mixed with 1 weight portion of a $LiMn_{1.5}Ni_{0.5}O_4$ compound, which was synthesized via a solid phase reaction to prepare a positive active material. The solid phase reaction was performed by the following method. $LiOH$, $MnO_2$, and $NiO_2$ were mixed well in the mole ratio of 1:1.5:0.5. The resulting mixture was heat-treated at 800° C. to prepare the $LiMn_{1.5}Ni_{0.5}O_4$ compound, which will be referred to as "solid phase-$LiMn_{1.5}Ni_{0.5}O_4$".

The positive active material, a polyvinylidene fluoride binder, and a carbon conductive agent were mixed in an N-methylpyrrolidone solvent to prepare a positive active material slurry. The mixing ratio of the positive active material, the binder, and the conductive agent was 94:3:3 by weight. Using the slurry, a positive electrode was produced by the conventional coating process. A negative electrode was produced by using an artificial graphite material, PHS, available from Japan Carbon Ltd., as a negative active material. With the positive electrode, the negative electrode, and an electrolyte, a 653450-prismatic cell with a nominal capacity of 950 mAh was fabricated. The electrolyte used was 1 M $LiPF_6$ in a mixture of ethylene carbonate, dimethyl carbonate, diethyl carbonate, and fluorobenzene. The formation of the prismatic cell was performed by charging and discharging at a 0.2C rate using cut-off voltages of 4.2 and 2.75V. The resulting cell was charged at 0.2C and discharged at 0.5C rate for a standard capacity measurement. The cycle life characteristics and a safety test (1C overcharge) were also performed.

EXAMPLE 2

A prismatic cell was fabricated by the same procedure as in Example 1, except that the positive active material was a mixture of 97 wt % of the surface-treated $LiCoO_2$ and 3 wt % of solid-phase $LiMn_{1.5}Ni_{0.5}O_4$.

EXAMPLE 3

A prismatic cell was fabricated by the same procedure as in Example 1, except that the positive active material was a mixture of 95 wt % of the surface-treated $LiCoO_2$ and 5 wt % of solid-phase $LiMn_{1.5}NiO_{0.5}O_4$.

EXAMPLE 4

A prismatic cell was fabricated by the same procedure as in Example 1, except that the positive active material was a mixture of 90 wt % of the surface-treated $LiCoO_2$ and 10 wt % of solid-phase $LiMn_{1.5}Ni_{0.5}O_4$.

EXAMPLE 5

A prismatic cell was fabricated by the same procedure as in Example 1, except that 80 wt % of the surface-treated $LiCoO_2$ was mixed with 20 wt % of solid-phase $LiMn_{1.5}Ni_{0.5}O_4$ to prepare a positive active material.

EXAMPLE 6

$LiOH$, $MnO_2$, and $NiO_2$ were mixed in the mole ratio of 1:1.7:0.3, and the mixture was heat-treated at 800° C. to prepare solid-phase $LiMn_{1.7}Ni_{0.3}O_4$. 10 wt % of the solid-phase $LiMn_{1.7}Ni_{0.3}O_4$ as an additive compound was mixed with 90 wt % of the surface-treated $LiCoO_2$ to prepare a positive active material. Using the positive active material, a prismatic cell was fabricated by the same procedure as in Example 1.

EXAMPLE 7

$LiOH$, $MnO_2$ and $NiO_2$ were mixed in the mole ratio of 1:1.2:0.8, and the mixture was heat-treated at 800° C. to prepare solid-phase $LiMn_{1.2}Ni_{0.8}O_4$. 10 wt % of the solid-phase $LiMn_{1.2}Ni_{0.8}O_4$ as an additive compound was mixed with 90 wt % of the surface-treated $LiCoO_2$ to prepare a positive active material. Using the positive active material, a prismatic cell was fabricated by the same procedure as in Example 1.

EXAMPLE 8

A prismatic cell was fabricated by the same procedure as in Example 1, except that the positive active material was a mixture of 99 wt % of the surface-treated $LiCoO_2$ and 1 wt % of the solid-phase $LiMn_{1.5}Ni_{0.5}O_4$. The solid-phase $LiMn_{1.5}Ni_{0.5}O_4$ was prepared by the same procedure as in Example 1, except that the heat-treatment was performed at 900° C.

EXAMPLE 9

A prismatic cell was fabricated by the same procedure as in Example 8, except that the positive active material was a mixture of 90 wt % of the surface-treated $LiCoO_2$ and 10 wt % of the solid-phase $LiMn_{1.5}Ni_{0.5}O_4$.

EXAMPLE 10

A prismatic cell was fabricated by the same procedure as in Example 1, except that the positive active material was a mixture of 99 wt % of the surface-treated $LiCoO_2$ and 1 wt % of the solid-phase $LiMn_{1.5}Ni_{0.5}O_4$. The solid-phase $LiMn_{1.5}Ni_{0.5}O_4$ was prepared by the same procedure as in Example 1, except that the heat-treatment was performed at 700° C.

EXAMPLE 11

A prismatic cell was fabricated by the same procedure as in Example 10, except that the positive active material was a mixture of 90 wt % of the surface-treated $LiCoO_2$ and 10 wt % of the solid-phase $LiMn_{1.5}Ni_{0.5}O_4$.

EXAMPLE 12

A prismatic cell was fabricated by the same procedure as in Example 1, except that the positive active material was a mixture of 99 wt % of a surface-treated $LiMn_2O_4$ and 1 wt % of the solid-phase $LiMn_{1.5}Ni_{0.5}O_4$. The surface-treated $LiMn_2O_4$ was prepared by coating with an Al-isopropoxide suspension and heat-treating it at 800° C., according to the procedure described in Korean Patent Application No. 98-42956.

Using the positive active material, a prismatic cell was fabricated by the same procedure as in Example 1.

EXAMPLE 13

A prismatic cell was fabricated by the same procedure as in Example 12, except that the positive active material was a mixture of 90 wt % of the surface-treated $LiMn_2O_4$ and 10 wt % of the solid-phase $LiMn_{1.5}Ni_{0.5}O_4$.

EXAMPLE 14

A prismatic cell was fabricated by the same procedure as in Example 1, except that the positive active material was a mixture of 99 wt % of a surface-treated $LiNi_{0.9}Co_{0.1}Sr_{0.002}O_2$ and 1 wt % of solid-phase $LiMn_{1.5}Ni_{0.5}O_4$. The surface-treated $LiNi_{0.9}Co_{0.1}Sr_{0.002}O_2$ was prepared by coating with an Al-isopropoxide suspension and heat-treating it at 800° C., according to the procedure described in Korean Patent Application No. 98-42956. The solid-phase $LiMn_{1.5}Ni_{0.5}O_4$ was prepared by the same procedure as in Example 1.

Using the positive active material, a prismatic cell was fabricated by the same procedure as in Example 1.

EXAMPLE 15

A prismatic cell was fabricated by the same procedure as in Example 14, except that 90 wt % of the surface-treated $LiNi_{0.9}Co_{0.1}Sr_{0.002}O_2$ was mixed with 10 wt % of the solid-phase $LiMn_{1.5}Ni_{0.5}O_4$ to prepare a positive active material.

EXAMPLE 16

A prismatic cell was fabricated by the same procedure as in Example 1, except that 99 wt % of a surface-treated $LiNi_{0.68}Mn_{0.2}Co_{0.1}Mg_{0.01}Al_{0.01}O_2$ was mixed with 1 wt % of the solid-phase $LiMn_{1.5}Ni_{0.5}O_4$ to prepare a positive active material. The surface-treated $LiNi_{0.68}Mn_{0.2}Co_{0.1}Mg_{0.01}Al_{0.01}O_2$ was prepared by coating with an Al-isopropoxide suspension and heat-treating it at 800° C., according to the procedure described in Korean Patent Application No. 98-42956.

Using the positive active material, a prismatic cell was fabricated by the same procedure as in Example 1.

EXAMPLE 17

A prismatic cell was fabricated by the same procedure as in Example 1, except that 90 wt % of the surface treated $LiNi_{0.68}Mn_{0.2}Co_{0.1}Mg_{0.01}Al_{0.01}O_2$ was mixed with 10 wt % of the solid-phase $LiMn_{1.5}Ni_{0.5}O_4$ to prepare a positive active material.

The standard capacities of the prismatic cells according to Examples 1 and 4 having theoretical capacities of 950 mAh and 930 mAh, respectively, were measured. The measurement capacities were 999 mAh and 996 mAh, respectively. Thus, the cells according to Examples 1 and 4 exhibited higher than the theoretical capacities by about 50 and 70 mAh, respectively.

Figure 1:
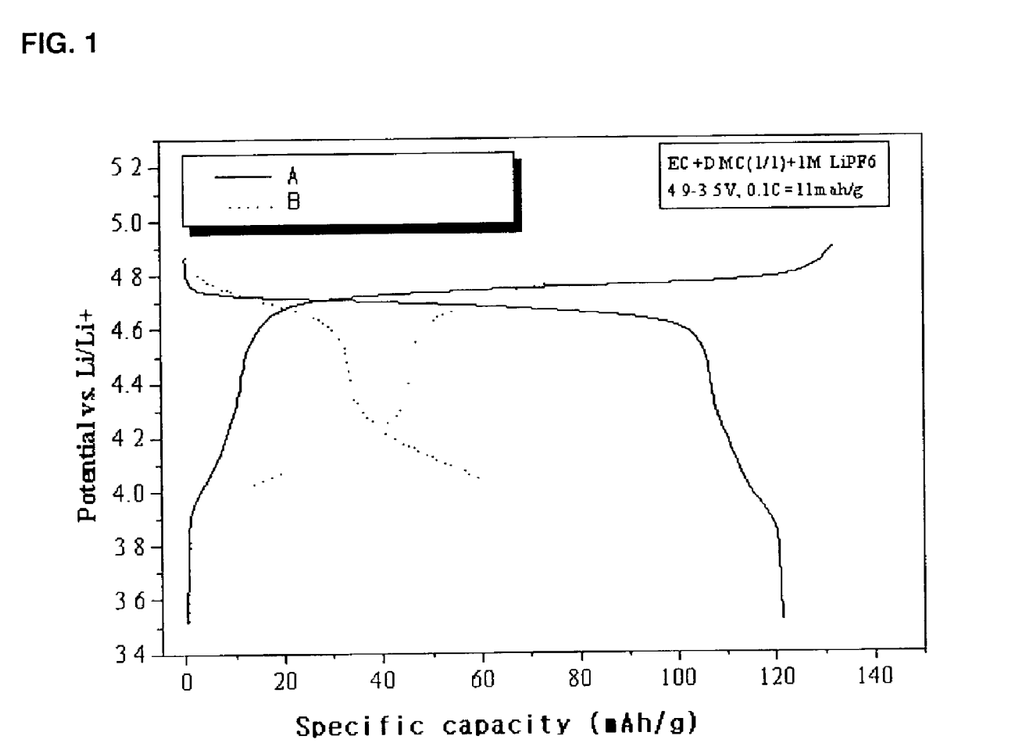
FIG. 1 is a graph showing charge and discharge characteristics of $LiMn_{1.5}Ni_{0.5}O_4$ (B) prepared by a solid phase reaction according to the present invention, and $LiMn_{1.5}Ni_{0.5}O_4$ (A) prepared by the conventional co-precipitation process.

Furthermore, in order to identify the effect on the battery performance by type of the additive compound preparation, the charge and discharge characteristics at 0.1C of solid phase-$LiMn_{1.5}Ni_{0.5}O_4$ (B) (additive compound used in Example 1) and co-precipitated $LiMn_{1.5}Ni_{0.5}O_4$ (A) (additive compound used in Comparative Example 2) were measured. The results are presented in FIG. 1. It is evident from FIG. 1 that the charge and discharge curve of the solid phase-$LiMn_{1.5}Ni_{0.5}O_4$ has a sharp slope and two charge and discharge plateaus. In addition, the solid phase-$LiMn_{1.5}Ni_{0.5}O_4$ exhibited a substantial portion of total capacity at potentials between about 3.9 and 4.3V, whereas the co-precipitated $LiMn_{1.5}Ni_{0.5}O_4$ exhibited only a slight portion of the capacity in this potential. The co-precipitated $LiMn_{1.5}Ni_{0.5}O_4$ was prepared by forming a $Mn_{0.75}Ni_{0.25}(OH)_2$ co-precipitation product and mixing the product with LiOH followed by a heat-treatment.

Figure 2:
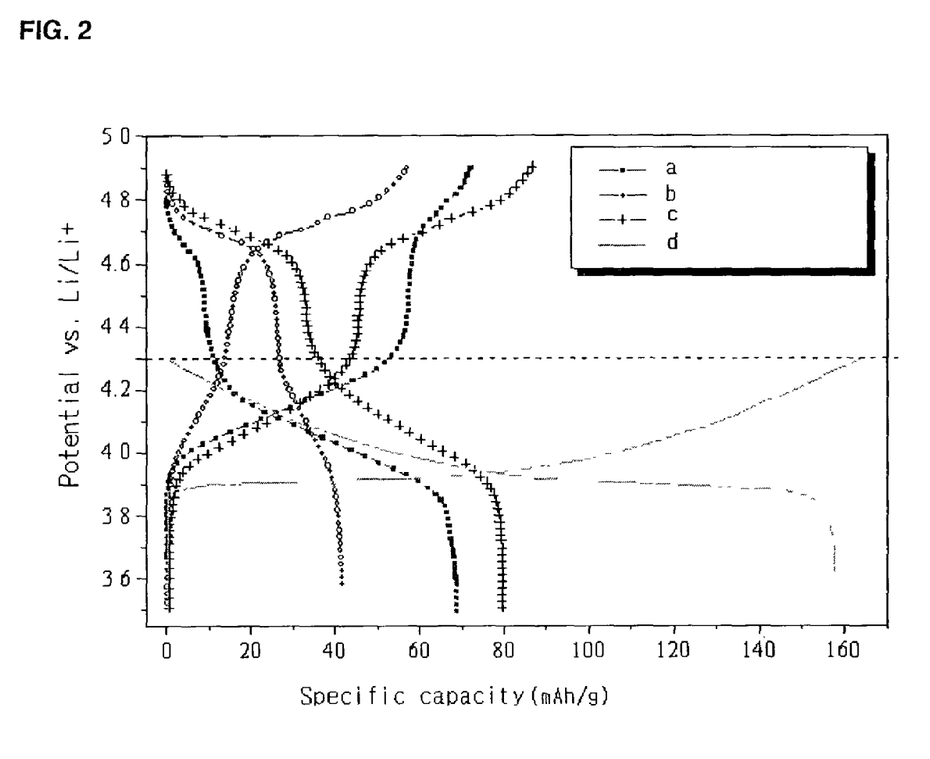
FIG. 2 is a graph showing charge and discharge characteristics of $LiMn_{1.7}Ni_{0.3}O_4$ (a), $LiMn_{1.2}Ni_{0.8}O_4$ (b), and $LiMn_{1.5}Ni_{0.5}O_4$ (c) prepared by a solid phase reaction according to the present invention and $LiCoO_2$ (d)

In addition, to evaluate the effect of the additive composition, the charge and discharge characteristic of $LiMn_{2-x}Ni_xO_4$ while varying the value of x, was measured, and the results are presented in FIG. 2. For a control reference, the charge and discharge characteristics of $LiCoO_2$ is also presented in FIG. 2. In FIG. 2, "a" refers to $LiMn_{1.7}Ni_{0.3}O_4$ (additive compound used in Example 6), "b" refers to $LiMn_{1.2}Ni_{0.8}O_4$ (additive compound used in Example 7), "c" refers to $LiMn_{1.5}Ni_{0.5}O_4$ (additive compound used in Example 1) and "d" refers to $LiCoO_2$. As shown in FIG. 2, the charge and discharge characteristic of $LiMn_{2-x}Ni_xO_4$ is significantly different from that of $LiCoO_2$. The charge and discharge characteristics vary according to the value of x (i.e. the ratio between Mn and Ni).

Figure 3:
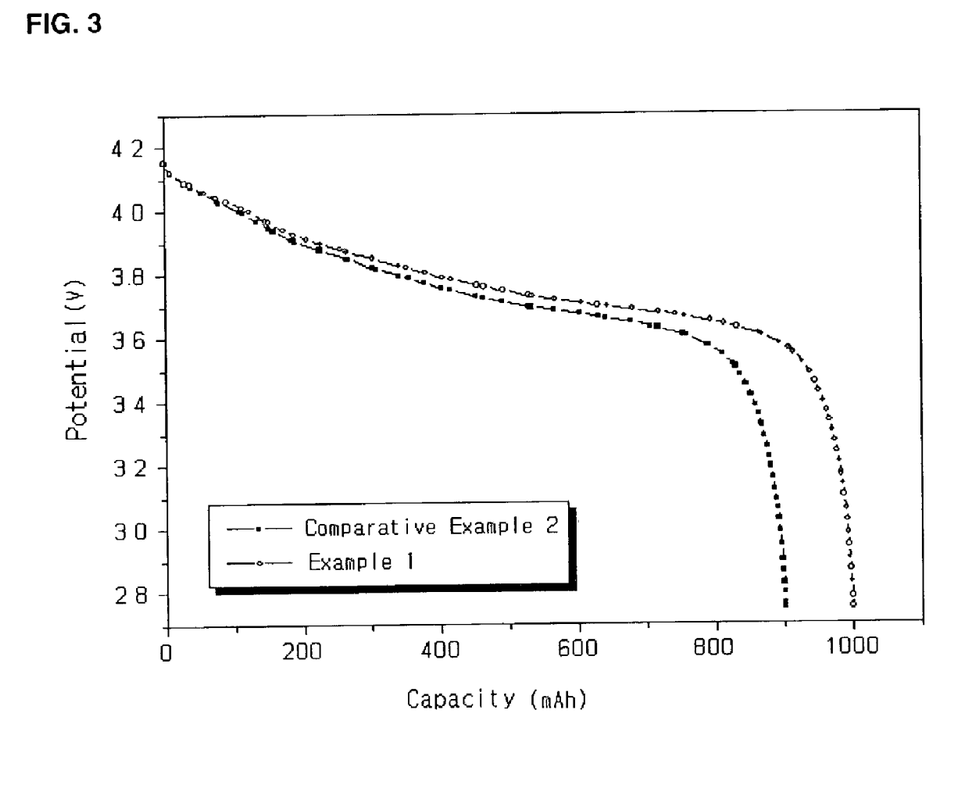
FIG. 3 is a graph showing discharge voltage curves for standard capacities of prismatic cells according to Example 1 of the present invention and Comparative Example 2.
Figure 4:
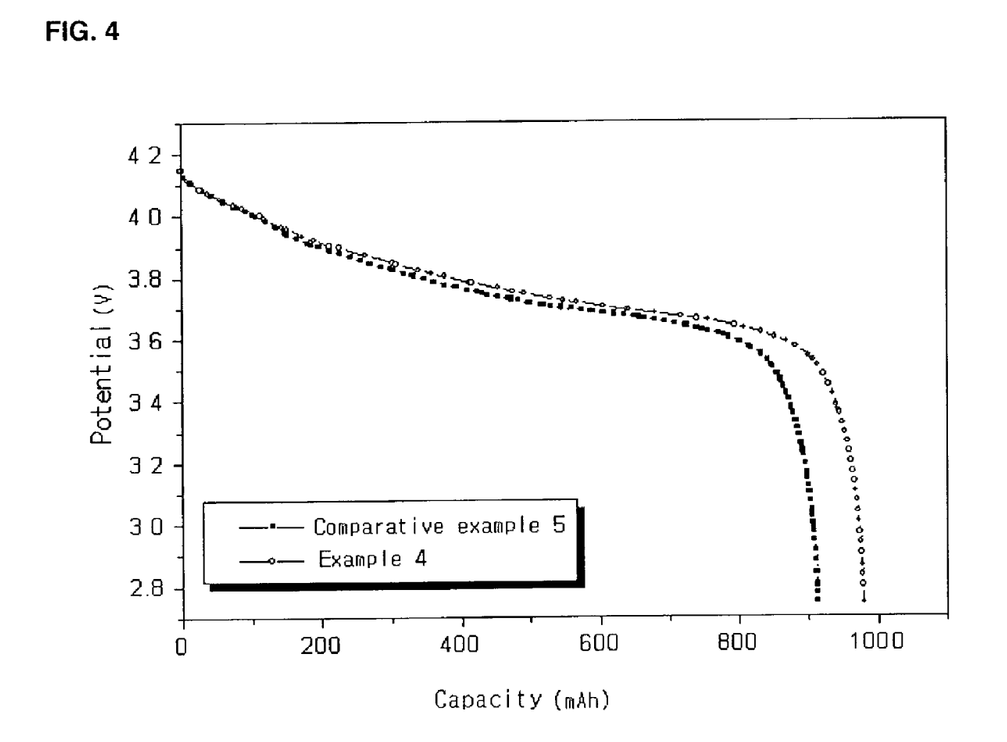
FIG. 4 is a graph showing discharge voltage curves for standard capacities of prismatic cells according to Example 4 of the present invention and Comparative Example 5.

FIG. 3 shows the discharge voltage curves for the standard capacity measurement of the prismatic cells according to Example 1 and Comparative Example 2. FIG. 4 shows those of the prismatic cells according to Example 4 and Comparative Example 5. It can be seen from FIGS. 3 and 4 that the cell according to Example 1 had a capacity of about 999 mAh, and the cell according to Example 4 had about 996 mAh. However, the cell according to Comparative Example 2 had a capacity of about 900 mAh, and the cell according to Comparative Example 5 had a capacity of about 910 mAh. That is, the cells according to Examples 1 and 4 had surprisingly higher capacities than those of Comparative Examples 1 and 5. From these results, it is believed that the positive active material of the present invention provides a high-capacity rechargeable lithium battery.

While the present invention has been described in detail with reference to the preferred embodiments, those skilled in the art will appreciate that various modifications and substitutions can be made thereto without departing from the spirit and scope of the present invention as set forth in the appended claims.

What is claimed is:

1. A positive active material for a rechargeable lithium battery comprising:
    a lithiated intercalation compound comprising at least one bare compound represented by the following formulas (1) to (12):

$$Li_xMn_{1-y}M_yA_2 \qquad (1)$$

$$Li_xMn_{1-y}M_yO_{2-z}X_z \qquad (2)$$

$$Li_xMn_2O_{4-z}X_z \qquad (3)$$

$$Li_xCo_{1-y}M_yA_2 \qquad (4)$$

$$Li_xCo_{1-y}M_yO_{2-z}X_z \qquad (5)$$

$$Li_xNi_{1-y}M_yA_2 \qquad (6)$$

$$Li_xNi_{1-y}M_yO_{2-z}X_z \qquad (7)$$

$$Li_xNi_{1-y}Co_yO_{2-z}X_z \qquad (8)$$

$$Li_xNi_{1-y-z}Co_yM_zA_\alpha \qquad (9)$$

$$Li_xNi_{1-y-z}Co_yM_zO_{2-\alpha}X_\alpha \qquad (10)$$

$$Li_xNi_{1-y-z}Mn_yM_zA_\alpha \quad (11)$$

$$Li_xNi_{1-y-z}Mn_yM_zO_{2-\alpha}X_\alpha \quad (12)$$

where $0.9 \leq x \leq 1.1$; $0 \leq y \leq 0.5$; $0 \leq z \leq 0.5$; $0 \leq \alpha \leq 2$; M is selected from the group consisting of Al, Ni, Co, Mn, Cr, Fe, Mg, Sr, V, and rare earth elements; A is selected from the group consisting of O, F, S, and P; and X is F, S, or P; and an additive compound comprising one or more compounds represented by the formula $M'Mn_{2-x}Ni_xO_4$, where M' is Li or Na, and x ranges from 0.1 to 0.9, wherein the bare compound is coated with a metal oxide shell and the additive compound has a charging voltage of 4.0 to 4.6V when 5-50% of the M' is released during charging, and wherein the mixing weight ratio of the lithiated intercalation compound and the additive compound ranges from 99.99 to 70: 0.01 to 30.

2. The positive active material of claim 1 wherein the metal oxide shell includes a metal selected from the group consisting of Mg, Al, Co, K, Na, Ca, Si, Ti, V, Sn, Ge, Ga, B, As, Zr, and mixtures thereof.

3. A positive active material for a rechargeable lithium battery comprising:

a lithiated intercalation compound comprising at least one bare compound represented by the following formulas (1) to (12):

$$Li_xMn_{1-y}M_yA_2 \quad (1)$$

$$Li_xMn_{1-y}M_yO_{2-z}X_z \quad (2)$$

$$Li_xMn_2O_{4-z}X_z \quad (3)$$

$$Li_xCo_{1-y}M_yA_2 \quad (4)$$

$$Li_xCo_{1-y}M_yO_{2-z}X_z \quad (5)$$

$$Li_xNi_{1-y}M_yA_2 \quad (6)$$

$$Li_xNi_{1-y}M_yO_{2-z}X_z \quad (7)$$

$$Li_xNi_{1-y}Co_yO_{2-z}X_z \quad (8)$$

$$Li_xNi_{1-y-z}Co_yM_zA_\alpha \quad (9)$$

$$Li_xNi_{1-y-z}Co_yM_zO_{2-\alpha}X_\alpha \quad (10)$$

$$Li_xNi_{1-y-z}Mn_yM_zA_\alpha \quad (11)$$

$$Li_xNi_{1-y-z}Mn_yM_zO_{2-\alpha}X_\alpha \quad (12)$$

where $0.9 \leq x \leq 1.1$; $0 \leq y \leq 0.5$; $0 \leq z \leq 0.5$; $0 \leq \alpha \leq 2$; M is selected from the group consisting of Al, Ni, Co, Mn, Cr, Fe, Mg, Sr, V, and rare earth elements; A is selected from the group consisting of O, F, S, and P; and X is F, S, or P; and an additive compound comprising one or more compounds represented by the formula $M'Mn_{2-x}N_xO_4$, where M is Li or Na, and x ranges from 0.1 to 0.9, wherein the bare compound is coated with a metal oxide shell, the additive compound has a discharging voltage of 4.0 to 5.0V when 5-50% of the M' is released during discharging, and wherein the mixing weight ratio of the lithiated intercalation compound and the additive compound ranges from 99.99 to 70:0.01 to 30, and the mixing weight ratio of the lithiated intercalation compound and the additive compound ranges from 99.9 to 90:0.1 to 10.

4. The positive active material of claim 3 wherein the metal oxide shell includes a metal selected from the group consisting of Mg, Al, Co, K, Na, Ca, Si, Ti, V, Sn, Ge, Ga, B, As, Zr, and mixtures thereof.

* * * * *

UNITED STATES PATENT AND TRADEMARK OFFICE
CERTIFICATE OF CORRECTION

| | |
|---|---|
| PATENT NO. | : 7,309,546 B2 |
| APPLICATION NO. | : 10/264043 |
| DATED | : December 18, 2007 |
| INVENTOR(S) | : Ho-Jin Kweon |

It is certified that error appears in the above-identified patent and that said Letters Patent is hereby corrected as shown below:

In the Claims

Column 12, line 14, Claim 3    After the word "where",
Delete "M" and insert --M'--

Signed and Sealed this

Twenty-eighth Day of October, 2008

JON W. DUDAS
*Director of the United States Patent and Trademark Office*